(12) United States Patent
Hueber et al.

(10) Patent No.: US 10,721,604 B2
(45) Date of Patent: Jul. 21, 2020

(54) METHOD AND SYSTEM FOR OPERATING A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Ian Thomas Macnamara, Graz (AT); Ghiath Al-kadi, Graz (AT)

(73) Assignee: NXP B.V., Eindhoven (NL)

( * ) Notice: Subject to any disclaimer, the term of this patent is extended or adjusted under 35 U.S.C. 154(b) by 41 days.

(21) Appl. No.: 15/383,382

(22) Filed: Dec. 19, 2016

(65) Prior Publication Data

US 2018/0176711 A1    Jun. 21, 2018

(51) Int. Cl.
*H04B 5/00* (2006.01)
*H04B 17/318* (2015.01)
*H04W 4/80* (2018.01)
*H04L 5/00* (2006.01)

(52) U.S. Cl.
CPC ............ *H04W 4/80* (2018.02); *H04B 5/0031* (2013.01); *H04B 5/0075* (2013.01); *H04B 17/318* (2015.01); *H04L 5/006* (2013.01)

(58) Field of Classification Search
CPC .......... H04B 5/02; H04B 5/0075; H02J 5/005
USPC .................................................. 455/41.1, 69
See application file for complete search history.

(56) References Cited

U.S. PATENT DOCUMENTS

| | | |
|---|---|---|
| 5,703,573 A | 12/1997 | Fujimoto et al. |
| 6,760,434 B1 | 7/2004 | Rezvani et al. |
| 6,799,015 B1 | 9/2004 | Tiwari |
| 7,200,375 B2 | 4/2007 | Kottschlag et al. |
| 7,268,644 B2 | 9/2007 | Kottschlag et al. |
| 7,295,594 B1 | 11/2007 | Lohr |
| 7,577,205 B1 | 8/2009 | Liu |
| 8,013,600 B1 | 9/2011 | Yepez, III et al. |
| 8,279,018 B1 | 10/2012 | Song et al. |
| 8,817,184 B1 | 8/2014 | Amirkhany et al. |
| 8,848,932 B2 | 9/2014 | Poulsen et al. |
| 8,964,605 B1 | 2/2015 | Ansari |
| 9,083,441 B2 | 7/2015 | Sahota et al. |
| 9,293,797 B2 | 3/2016 | Kim et al. |
| 9,727,812 B2 | 8/2017 | Forster |

(Continued)

FOREIGN PATENT DOCUMENTS

| | | |
|---|---|---|
| EP | 2 395 673 A2 | 12/2011 |
| EP | 2 752 999 A1 | 7/2014 |

(Continued)

OTHER PUBLICATIONS

European Search Report, 17198699, dated Apr. 26, 2018.

(Continued)

*Primary Examiner* — Zhitong Chen (57) ABSTRACT

Embodiments of methods and systems for operating a communications device that communicates via inductive coupling are described. In an embodiment, a method for operating a communications device that communicates via inductive coupling involves obtaining at least one system or environmental parameter related to the communications device and adjusting a communications configuration of the communications device in response to the at least one system or environmental parameter. Other embodiments are also described.

20 Claims, 6 Drawing Sheets

(56) References Cited

U.S. PATENT DOCUMENTS

| | | | |
|---|---|---|---|
| 9,960,735 | B1 | 5/2018 | Ding et al. |
| 9,985,732 | B2 | 5/2018 | Cordier |
| 10,153,644 | B2 | 12/2018 | Devaul et al. |
| 2002/0097144 | A1 | 7/2002 | Collins et al. |
| 2004/0135622 | A1 | 7/2004 | Masleid et al. |
| 2004/0174185 | A1 | 9/2004 | Lin et al. |
| 2005/0232300 | A1 | 10/2005 | Stiscia et al. |
| 2005/0259764 | A1 | 11/2005 | Hung Lai et al. |
| 2006/0132362 | A1 | 6/2006 | Yuanzhu |
| 2007/0293168 | A1 | 12/2007 | Kottschlag et al. |
| 2008/0186105 | A1 | 8/2008 | Scuderi et al. |
| 2008/0238679 | A1* | 10/2008 | Rofougaran ......... G06K 7/0008 340/572.2 |
| 2010/0148929 | A1* | 6/2010 | Wu ..................... G06K 7/0008 340/10.1 |
| 2010/0237709 | A1 | 9/2010 | Hall et al. |
| 2010/0273441 | A1 | 10/2010 | Dubash et al. |
| 2011/0065398 | A1 | 3/2011 | Liu et al. |
| 2011/0068636 | A1 | 3/2011 | Lee et al. |
| 2011/0300800 | A1 | 12/2011 | Wuidart |
| 2012/0056718 | A1 | 3/2012 | Leutgeb et al. |
| 2012/0092901 | A1 | 4/2012 | Wuidart |
| 2012/0094610 | A1 | 4/2012 | Lunden et al. |
| 2012/0122461 | A1* | 5/2012 | Hossain ............. H04W 72/085 455/450 |
| 2012/0152938 | A1 | 6/2012 | Nordh et al. |
| 2012/0153732 | A1* | 6/2012 | Kurs .................... B60L 3/0069 307/104 |
| 2012/0153835 | A1 | 6/2012 | Su et al. |
| 2013/0099587 | A1 | 4/2013 | Lou et al. |
| 2013/0109330 | A1 | 5/2013 | Sahota |
| 2013/0258911 | A1 | 10/2013 | Choksi |
| 2013/0271342 | A1 | 10/2013 | Shen |
| 2013/0272044 | A1 | 10/2013 | Boys et al. |
| 2013/0328734 | A1 | 12/2013 | Thind |
| 2014/0015330 | A1 | 1/2014 | Byun et al. |
| 2014/0044293 | A1* | 2/2014 | Ganem ................. H02J 50/50 381/323 |
| 2014/0050124 | A1 | 2/2014 | Yang et al. |
| 2014/0073243 | A1 | 3/2014 | Hijioka et al. |
| 2014/0080409 | A1 | 3/2014 | Frankland et al. |
| 2014/0101747 | A1 | 4/2014 | Lu et al. |
| 2014/0111023 | A1 | 4/2014 | Kagami et al. |
| 2014/0142436 | A1 | 5/2014 | Hutchins et al. |
| 2014/0240057 | A1 | 8/2014 | Low et al. |
| 2014/0241556 | A1 | 8/2014 | Larsen et al. |
| 2014/0306780 | A1 | 10/2014 | Lehtinen |
| 2015/0022145 | A1 | 1/2015 | Kim et al. |
| 2015/0054453 | A1 | 2/2015 | White, II et al. |
| 2015/0061404 | A1* | 3/2015 | Lamenza ................ H03H 7/40 307/104 |
| 2015/0065065 | A1 | 3/2015 | Rofougaran et al. |
| 2015/0079903 | A1 | 3/2015 | Song et al. |
| 2015/0171919 | A1* | 6/2015 | Ballantyne ............ H04W 24/10 455/151.2 |
| 2015/0215937 | A1 | 7/2015 | Khandani |
| 2015/0270719 | A1 | 9/2015 | Kurs et al. |
| 2015/0270876 | A1 | 9/2015 | Kim et al. |
| 2015/0280443 | A1 | 10/2015 | Vladan et al. |
| 2015/0280444 | A1* | 10/2015 | Smith ..................... H02J 17/00 307/104 |
| 2015/0303997 | A1 | 10/2015 | Dhayni |
| 2016/0100312 | A1 | 4/2016 | Bell et al. |
| 2016/0112146 | A1 | 4/2016 | Lau et al. |
| 2016/0142109 | A1* | 5/2016 | Kumar ................. H04B 5/0031 455/41.1 |
| 2016/0172890 | A1 | 6/2016 | Jeong |
| 2016/0174267 | A1 | 6/2016 | Mofidi et al. |
| 2016/0197510 | A1 | 7/2016 | Strommer et al. |
| 2016/0294227 | A1* | 10/2016 | Podkamien ............... H02J 5/00 |
| 2016/0365737 | A1 | 12/2016 | Vladan |
| 2017/0001003 | A1 | 1/2017 | Pivonka et al. |
| 2017/0005533 | A1 | 1/2017 | Zeine et al. |
| 2017/0012590 | A1 | 1/2017 | Fong et al. |
| 2017/0093168 | A1* | 3/2017 | Von Novak, III ...... H02J 5/005 |
| 2017/0104468 | A1 | 4/2017 | Kormann et al. |
| 2017/0110796 | A1* | 4/2017 | Rokhsaz ................ H01Q 7/005 |
| 2017/0141620 | A1 | 5/2017 | Zeine et al. |
| 2017/0205481 | A1 | 7/2017 | Kim et al. |
| 2017/0230204 | A1 | 8/2017 | Sivertsen |
| 2017/0264322 | A1 | 9/2017 | Greene et al. |
| 2017/0270323 | A1* | 9/2017 | Butler ................. H04L 67/1097 |
| 2017/0310346 | A1 | 10/2017 | White et al. |
| 2017/0373541 | A1 | 12/2017 | Shimokawa et al. |
| 2018/0040953 | A1 | 2/2018 | Gebhart et al. |
| 2018/0054086 | A1 | 2/2018 | Jung |
| 2018/0102151 | A1 | 4/2018 | Kim et al. |
| 2018/0176712 | A1 | 6/2018 | Gernot et al. |
| 2019/0097687 | A1 | 3/2019 | Hueber et al. |

FOREIGN PATENT DOCUMENTS

| | | |
|---|---|---|
| EP | 2988427 A1 | 2/2016 |
| EP | 3 156 935 A1 | 4/2017 |
| WO | 2009015115 A1 | 1/2009 |

OTHER PUBLICATIONS

Notice of Allowance for U.S. Appl. No. 15/383,496 dated May 16, 2019, 24 pages.

Notice of Allowance for U.S. Appl. No. 15/715,044 dated May 13, 2019, 14 pages.

Notice of Allowance for related U.S. Appl. No. 15/715,044 (dated Apr. 3, 2019), 13 pages.

Non-final Office Action for U.S. Appl. No. 15/715,027 dated Jun. 14, 2018, 13 pages.

Final Office Action for U.S. Appl. No. 15/715,027 dated Jan. 9, 2019, 11 pages.

Sartori, E. "Hybrid Transformers", IEEE Transactions on Parts, Materials and Packaging, vol. 4, No. 3, pp. 59-66 (Sep. 1968).

Abdelhalem, S. H. et al. "Hybrid Transformer-Based Tunable Differential Duplexer in a 90-nm CMOS Process", IEEE Transactions on Microwave Theory and Techniques, vol. 61, No. 3, pp. 1316-1326 (Mar. 2013).

Office action for related U.S. Appl. No. 15/383,406 (dated Nov. 17, 2017).

Office action for related U.S. Appl. No. 15/383,406 (dated May 23, 2018).

Office action for related U.S. Appl. No. 15/383,406 (dated Sep. 5, 2018).

Office action for related U.S. Appl. No. 15/383,406 (dated Feb. 13, 2019).

Office action for related U.S. Appl. No. 15/715,044 (dated Jul. 6, 2018).

Notice of Allowance for related U.S. Appl. No. 15/715,044 (dated Jan. 24, 2019).

U.S. Appl. No. 15/715,044.

"Circulators and Isolators, unique passive devices—Application Note—AN98035", Philips Semiconductors, 31 pgs., retrieved from the internet Mar. 19, 2019 at: http://f6csx.free.fr/techni/CIRCU/Circulateurs2.pdf (Mar. 1998).

Langwieser, R. et al. "A Modular UHF Reader Frontend for a Flexible RFID Testbed", Institute of Communications and Radio-Frequency Engineering, Vienna University of Technology, 12 pgs, retrieved from the internet Mar. 19, 2019 at: https://www.eurasip.org/Proceedings/Ext/RFID2008/modular_UHF.pdf. (2008).

Reiskarimian, N. et al. "Magnetic-free non-reciprocity based on staggered commutation", Nature Communications, 10 pgs., retrieved from the internet Mar. 19, 2019 at: https://www.nature.com/articles/ncomms11217.pdf (Apr. 2016).

Non-Final Office Action for U.S. Appl. No. 15/715,027 dated Jun. 11, 2019, 12 pages.

Notice of Allowance for U.S. Appl. No. 15/715,027 dated Nov. 6, 2019, 8 pages.

(56) References Cited

OTHER PUBLICATIONS

Notice of Allowance dated Mar. 27, 2020 in U.S. Appl. No. 15/715,027.

* cited by examiner

METHOD AND SYSTEM FOR OPERATING A COMMUNICATIONS DEVICE THAT COMMUNICATES VIA INDUCTIVE COUPLING

BACKGROUND

Communications devices can communicate with each other via inductive coupling. For example, near field communications (NFC) is a wireless technology based on radio frequency identification (RFID). NFC defines a wireless connection between two devices in close proximity to each other such that data can be exchanged between the two devices. For example, the data communications between a reader and a transponder typically are bi-directional and initialed by the reader, which generates a continuous magnetic field. RFID devices that utilize NFC typically can be configured for either passive load modulation (PLM) or active load modulation (ALM).

In a communications device that communicates via inductive coupling, performance may degrade in corner cases (e.g., when the communications device is too close to a corresponding communications device or is too far away from a corresponding communications device). For example, a detuning condition can affect power transfer, shift characteristics (e.g., resonant frequency and Q-factor) of a matching network of the communications device, and the load of the transmitter.

SUMMARY

Embodiments of methods and systems for operating a communications device that communicates via inductive coupling are described. In an embodiment, a method for operating a communications device that communicates via inductive coupling involves obtaining at least one system or environmental parameter related to the communications device and adjusting a communications configuration of the communications device in response to the at least one system or environmental parameter. Other embodiments are also described.

In an embodiment, the at least one system or environmental parameter is selected from the group consisting of information regarding a received signal at the communications device or a transmitted signal from the communications device, information regarding a component of the communications device, a communications protocol of the communications device, a communications data rate of the communications device, a modulation scheme of the communications device, and an external trigger signal.

In an embodiment, the information regarding the received signal at the communications device or the transmitted signal from the communications device includes a received signal strength indicator (RSSI) of the received signal.

In an embodiment, the information regarding the component of the communications device includes an antenna characteristic of the communications device or a matching network characteristic of the communications device.

In an embodiment, the at least one system or environmental parameter contains information regarding a detuning condition in the communications device.

In an embodiment, adjusting the communications configuration of the communications device includes adjusting the communications configuration of the communications device according to a function or a lookup table of a group of system or environmental parameters.

In an embodiment, the communications configuration is selected from the group consisting of a transmitter impedance of the communications device, a configuration of a matching network of the communications device, a phase configuration of the communications device, a modulation or demodulation configuration of the communications device, a gain configuration of the communications device, and a transmitter power configuration of the communications device.

In an embodiment, adjusting the communications configuration of the communications device includes adjusting a receiver demodulation configuration of the communications device or a receiver gain in the communications device in response to the at least one system or environmental parameter.

In an embodiment, adjusting the communications configuration of the communications device includes adjusting the communications configuration of the communications device in response to the at least one system or environmental parameter to change a signal-to-noise ratio (SNR) at a corresponding communications device.

In an embodiment, adjusting the communications configuration of the communications device includes adjusting the communications configuration of the communications device in response to the at least one system or environmental parameter before or after reception of an input data frame or before or after transmission of an output data frame.

In an embodiment, obtaining the at least one system or environmental parameter related to the communications device includes receiving a control signal from a device that is external to the communications device.

In an embodiment, a communications device that communicates via inductive coupling includes a parameter obtaining unit configured to obtain at least one system or environmental parameter related to the communications device and a communications configuration adjusting unit configured to adjust a communications configuration of the communications device in response to the at least one system or environmental parameter.

In an embodiment, the at least one system or environmental parameter is selected from the group consisting of information regarding a received signal at the communications device or a transmitted signal from the communications device, information regarding a component of the communications device, a communications protocol of the communications device, a communications data rate of the communications device, a modulation scheme of the communications device, and an external trigger signal.

In an embodiment, the information regarding the received signal at the communications device or the transmitted signal from the communications device includes an RSSI of the received signal.

In an embodiment, the information regarding the component of the communications device includes an antenna characteristic of the communications device or a matching network characteristic of the communications device.

In an embodiment, the at least one system or environmental parameter contains information regarding a detuning condition in the communications device.

In an embodiment, the communications configuration is selected from the group consisting of a transmitter impedance of the communications device, a configuration of a matching network of the communications device, a phase configuration of the communications device, a modulation or demodulation configuration of the communications device, a gain configuration of the communications device, and a transmitter power configuration of the communications device.

In an embodiment, the communications configuration adjusting unit is configured to adjust a receiver demodulation configuration of the communications device or a receiver gain in the communications device in response to the at least one system or environmental parameter.

In an embodiment, the communications configuration adjusting unit is configured to adjust the communications configuration of the communications device in response to the at least one system or environmental parameter to change an SNR at a corresponding communications device.

In an embodiment, a method for operating a communications device that communicates via inductive coupling involves obtaining a group of system or environmental parameters related to the communications device and adjusting a communications configuration of the communications device according to a function or a lookup table of the group of system or environmental parameters to change an SNR at a corresponding communications device.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
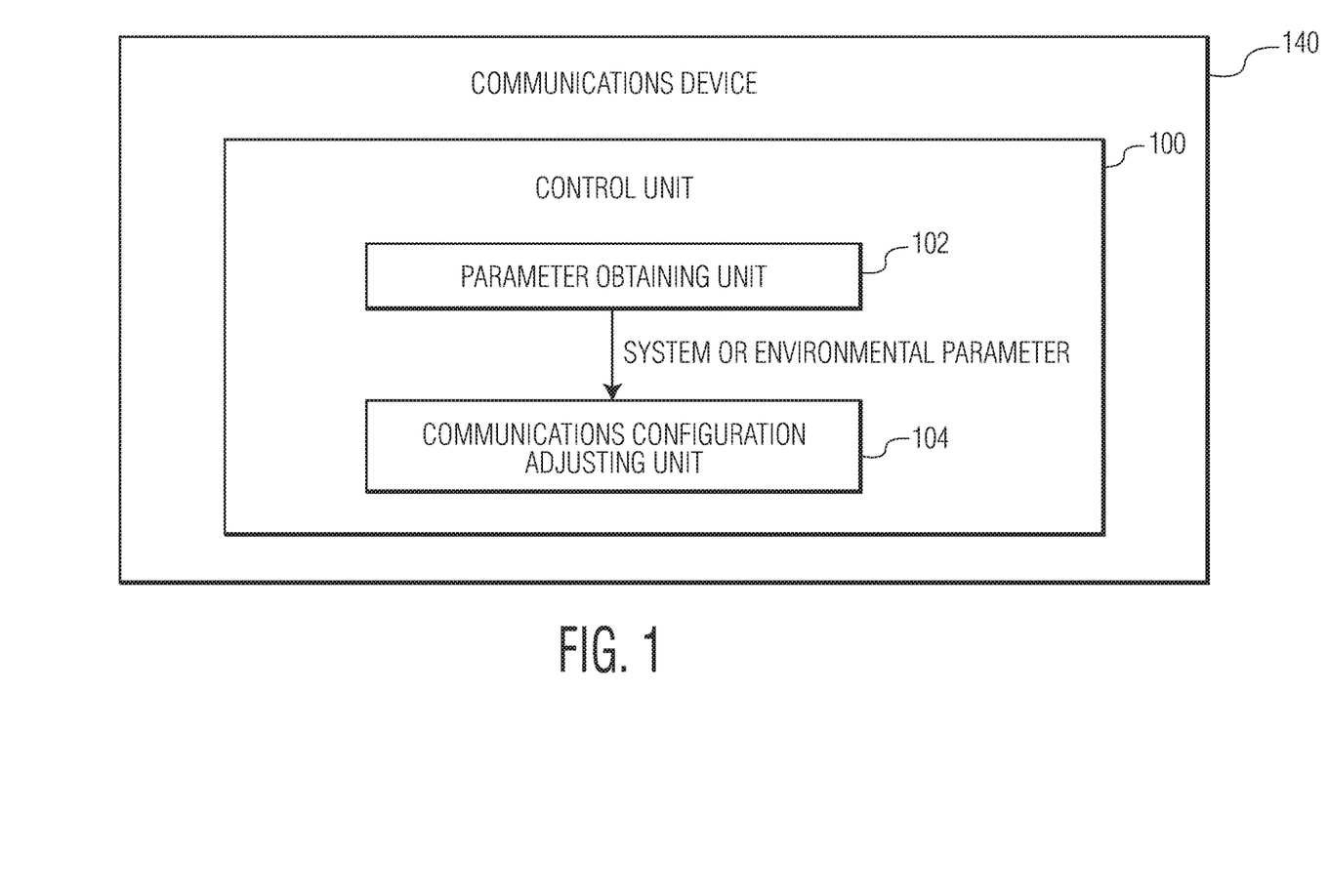
FIG. 1 is a functional block diagram of a communications device in accordance with an embodiment of the invention.

FIG. 1 is a functional block diagram of a communications device 140 in accordance with an embodiment of the invention. In the embodiment depicted in FIG. 1, the communications device communicates via inductive coupling. In some embodiments, the communications device may be a card/transponder device or the communications device may be in a "card-mode." In some other embodiments, the communications device may be a reader device or the communications device may be in a "reader mode." The communications device may include a control unit 100 configured to control the system performance of the communications device. For example, the control unit can control the system performance of the communications device such that the communications range is increased, the bit error rate is lowered, and/or the communications stability is improved. In the embodiment depicted in FIG. 1, the control unit includes a parameter obtaining unit 102 and a communications configuration adjusting unit 104. The communications device may be an integrated circuit (IC) device. In some embodiments, the communications device is implemented in a handheld computing system or a mobile computing system, such as a mobile phone. The communications device may be a near field communications (NFC) device that utilizes inductive coupling to communicate. In some embodiments, the communications device is implemented as an RF transponder compatible with the International Organization for Standardization (ISO)/the International Electrotechnical Commission (IEC) 14443 standard. Although the illustrated communications device is shown with certain components and described with certain functionality herein, other embodiments of the communications device may include fewer or more components to implement the same, less, or more functionality. In some embodiments, the communications device is an active load modulation (ALM) device. In such embodiments, the communications device can be configured to generate its own magnetic field for transmitting an outgoing RF signal using a current source, such as a battery, which results in greater communications distances compared to passive load modulation (PLM) systems.

In some embodiments, the control unit 100 can control the overall system performance of the communications device 140 based on one or more system or environmental parameters related to the communications device. The communications device can perform various operations to improve the overall system performance of the communications device. For example, the communications device can adjust the configuration/setting of a matching network of the communications device, a receiver of the communication device, and/or a transmitter of the communications device. In another example, the communications device can adjust a phase configuration/setting of the communications device, a modulation and/or demodulation configuration/setting of the communications device, an impedance configuration/setting of the communications device, a gain configuration/setting of the communications device, and/or a transmitter output power configuration/setting of the communications device. The control device can also operate the communications device according to the adjusted configuration. Consequently, the overall inductive coupling based communications performance of the communications device can be improved.

In the embodiment depicted in FIG. 1, the parameter obtaining unit 102 is used to obtain at least one system or environmental parameter related to the communications device 140. The parameter obtaining unit may be implemented as firmware, hardware and a combination of software, firmware, and/or hardware. In some embodiments, the parameter obtaining unit includes at least one sensor, for example, a voltage sensor or a current sensor. In some embodiments, the at least one system or environmental parameter includes information regarding a received signal at the communications device and/or a transmitted signal from the communications device, information regarding components (e.g., an antenna characteristic (e.g., the antenna geometry) and/or a matching network characteristic) of the communications device, and/or communications configuration information (e.g., a communications protocol of the communications device, protocol-state, a modulation scheme of the communications device, and/or a communications data rate of the communications device) of the communications device. In some embodiments, the at least one system or environmental parameter related to the communications device is used to derive information that can be used to improve system performance of the communications device in corner cases, for example, when the communications device is too close to a corresponding communications device (e.g., a reader device or a card/tag device) or is too far away from a corresponding communications device. For example, the at least one system or environmental parameter related to the communications device is used to derive information that can be used to improve system performance of the communications device when the communications device is within 1/10 of the NFC communications range from a corresponding communications device or is more than 10 times the NFC communications range from a corresponding communications device. In an embodiment, the at least one system or environmental parameter related to the communications device contains information regarding a detuning condition in the communications device. In some embodiments, the at least one system or environmental parameter includes a transmitter voltage of the communications device, a transmitter current of the communications device, and/or a received signal strength indicator (RSSI) at the communications device.

In the embodiment depicted in FIG. 1, the communications configuration adjusting unit 104 is used to adjust a communications configuration of the communications device 140 in response to the at least one system or environmental parameter. The communications configuration adjusting unit may be implemented as software, firmware, hardware and a combination of software, firmware, and/or hardware. In some embodiments, the communications configuration adjusting unit includes at least one processor, for example, a microprocessor. The communications configuration adjusting unit can adjust the communications configuration of the communications device to improve the overall system performance of the communications device. For example, the communications configuration adjusting unit can adjust the configuration of a matching network of the communications device, a receiver of the communication device, and/or a transmitter of the communications device. In another example, the communications configuration adjusting unit can adjust a phase configuration of the communications device, a modulation/demodulation configuration of the communications device, a transmitter impedance configuration of the communications device, a gain configuration of the communications device, and/or an output power configuration of the communications device. In some embodiments, the communications configuration adjusting unit can compensate for a detuning condition in the communications device 140 to improve the overall system performance of the communications device.

Figure 2:
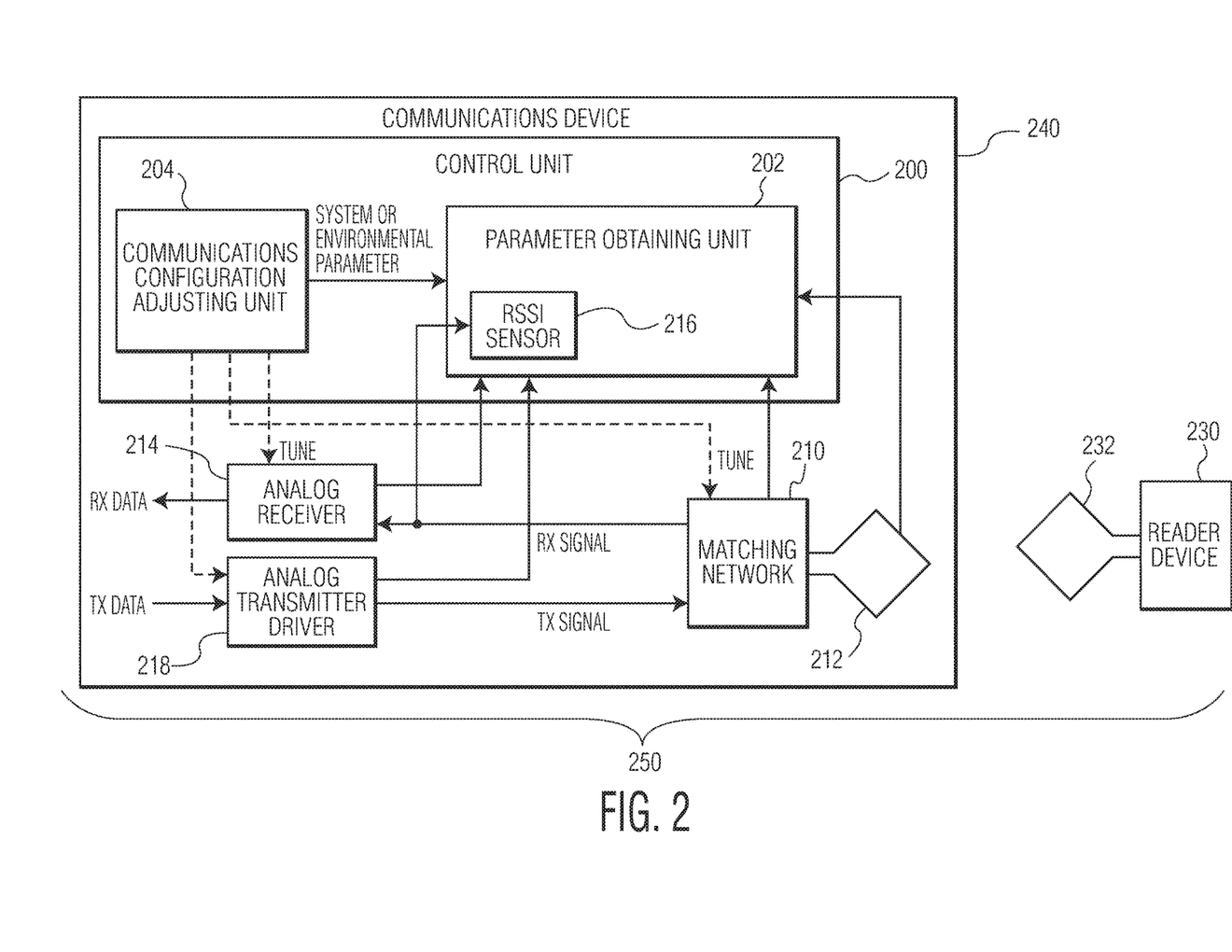
FIG. 2 depicts an embodiment of a communications device that can be used with a corresponding reader to form an inductively coupled communications system.

FIG. 2 depicts an embodiment of a communications device 240, similar to the communications device 140 depicted in FIG. 1, which can be used with a corresponding reader device 230 to form an inductively coupled communications system 250. The corresponding reader device may be a dedicated reader device or a communications device in reader-mode. In the embodiment depicted in FIG. 2, the communications device 240 includes a control unit 200, a matching network 210 that is coupled to an antenna 212, an analog receiver 214, and an analog transmitter driver 218. The antenna may be an induction type antenna such as a loop antenna. In some embodiments, the analog receiver and/or the transmitter driver are compatible with one or more standards for wireless power transfer. Examples of the standards for wireless power transfer may include, without being limited to, the Alliance for Wireless Power (A4WP/Wipower) specification, the Wireless Power Consortium Qi inductive charging specification, and Witricity inductive charging specifications. However, the standards for wireless power transfer with which the communication device is compatible are not limited to the examples described. In an example operation of the communications device, an RF signal (e.g., an RX signal) is received by the antenna via inductive coupling from an antenna 232 of the corresponding reader device and is passed to the analog receiver to convert the RF signal into a digital signal (e.g., RX data). A signal (e.g., TX data) is generated in response to the RF signal and is used to produce an outgoing RF signal (e.g., a TX signal) at the analog transmitter driver, which is transmitted via inductive coupling using the antenna. The communications device 240 depicted in FIG. 2 is one possible embodiment of the communications device 140 depicted in FIG. 1. However, the communications device in FIG. 1 is not limited to the embodiment shown in FIG. 2. For example, the communications device 240 depicted in FIG. 2 may include a low-dropout regulator (LDO) or an automatic gain control device to regulate the supply voltage to the transmitter driver. In some embodiments, the communications device 240 is an active load modulation (ALM) device. In addition, although the communications device 240 is shown in FIG. 2 as being used with the corresponding reader device 230 to form the inductively coupled communications system 250, in other embodiments, the communications device 240 is in reader mode and is used with a corresponding card/tag device to form an inductively coupled communications system.

The system performance of the communication device 240 may degrade in corner cases (e.g., in when the communication device is too close to the corresponding reader device 230 or too far away from the corresponding reader device). For example, a detuning condition in the inductively coupled communications system 250 can affect multiple factors that have an effect on the system performance of the inductively coupled communications system. For example, the detuning condition can affect the load on the antenna 212 of the communications device 240 and hence the load on the transmitter driver 218. For a highly detuned communications system, the load on the transmitter driver can be relatively low (e.g., lowered by 10 dB). Consequently, the current for the voltage controlled transmitter driver can increase, which will increase the driver current and power dissipation. The detuning condition can also affect the load on the analog receiver 214. For example, in the event of an increase in power at the matching network 210, the receiver might get overloaded and/or the receiver signal budget can change. The detuning condition can also affect the phase configuration of the communications device 240. For example, due to the change in the inductively coupled communications system caused by the detuning condition, the phase relation caused by the matching networks and antennas of the communications device 240 and the corresponding reader device 230 can change. For phase sensitive communication (e.g., ALM in FeliCa network, EMVCo LMA), the detuning condition can negatively affect the load modulation amplitude (LMA) performance. The detuning condition can also affect the frequency response of the inductively coupled communications system. For example, the detuning condition can impact the frequency response (resonant frequency, Q-factor) of the antenna/matching network of the communications device 240 and the corresponding reader device and consequently, affect the transferred signal (amplitude and phase) in both communication directions. The detuning condition in the inductively coupled communications system may be important for platforms with small antennas such as wearable devices and/or platforms with significant metal content that may degrade the quality of the communication or degrade the power transfer performance.

The control unit 200 can improve the system performance of the communications device in corner cases (e.g., in when the communication device is too close to the corresponding reader device 230 or too far away from the corresponding reader device). For example, the control unit can control the system performance of the communications device such that the communications range is increased, the bit error rate is lowered, and/or the communications stability is improved. In the embodiment depicted in FIG. 2, the control unit includes a parameter obtaining unit 202 and a communications configuration adjusting unit 204. The parameter obtaining unit and/or the communications configuration adjusting unit can be implemented as software, firmware, hardware and a combination of software, firmware, and/or hardware. The control unit 200 depicted in FIG. 2 is one possible embodiment of the control unit 100 depicted in FIG. 1. In particular, the parameter obtaining unit 202 and the communications configuration adjusting unit 204 depicted in FIG. 2 are embodiments of the parameter obtaining unit 102 and the communications configuration adjusting unit 104 depicted in FIG. 1. However, the control unit 100 depicted in FIG. 1 is not limited to the embodiment shown in FIG. 2. In some embodiments, the control device includes a processor (e.g., a microcontroller) configured to operate the communications device according to an adjusted configuration from the communications configuration adjusting unit.

In the embodiment depicted in FIG. 2, the parameter obtaining unit 202 is used to obtain at least one system or environmental parameter related to the communications device 240. The parameter obtaining unit may be implemented as firmware, hardware and a combination of software, firmware, and/or hardware. In some embodiments, the parameter obtaining unit includes at least one sensor, for example, a voltage sensor or a current sensor. The parameter obtaining unit can obtain instantaneous conditions of the transmitted and received signal and power levels, instantaneous conditions of the antenna 212 and the matching network 210, and communications configuration information (e.g., protocol, protocol state, modulation scheme, and/or data rate) of the communications device, from, for example, at least one sensor/detector within the communications device and/or at least one external device/detector. In some embodiments, the at least one system or environmental parameter related to the communications device is used to derive information that can be used to improve system performance of the communications device in corner cases, for example, when the communications device is too close to a corresponding communications device (e.g., a reader device or a card/tag device) or is too far away from a corresponding communications device. In some embodiments, the parameter obtaining unit includes an RSSI sensor 216 configured to measure the signal amplitude of the received RF signal (RX signal) to generate a received signal strength indicator (RSSI) value. In some embodiments, the RSSI sensor is implemented as a combination of an analog to digital converter, an absolute value (ABS) calculator, and/or an accumulator that calculates the sum of the power of multiple samples of a received signal at the communications device and generates an average power value as an RSSI of the received signal at the communications device.

In the embodiment depicted in FIG. 2, the communications configuration adjusting unit 204 is used to adjust a communications configuration of the communications device 240 in response to the at least one system or environmental parameter. The communications configuration adjusting unit can adjust the communications configuration of the communications device to improve the overall system performance of the communications device in corner cases (e.g., in when the communication device is too close to the corresponding reader device 230 or too far away from the corresponding reader device). For example, the communications configuration adjusting unit can adjust the communications configuration of the communications device to reduce the bit error rate. In another example, the communications configuration adjusting unit can adjust the communications configuration of the communications device to compensate for a detuning condition in the communications device to change a signal-to-noise ratio (SNR) at a corresponding communications device (e.g., to increase the SNR at the corresponding reader device 230). In some embodiments, the communications configuration adjusting unit adjusts/tunes the configuration of the matching network 210. For example, the communications configuration adjusting unit may adjust/tune one or more capacitors in the matching network by a varactor or by switching on or off at least one additional capacitor in parallel using a switching device, for example, a field-effect transistor (FET) switch. In some embodiments, the communications configuration adjusting unit adjusts/tunes the transmitter impedance of the communications device, adjusts the transmitter output voltage in the communications device, adjusts/tunes the transmitter phase (e.g., the phase of active load modulation (ALM)) in the communications device, adjusts the transmitter output power and thus to adjust the ALM in the communications device, and/or adjusts the transmitter modulation configuration (e.g., the slew rate and/or overshoot/undershoot control) in the communications device. For example, the communications configuration adjusting unit may adjust/tune the transmitter impedance of the communications device by switching on or off one or more transmitter output transistors connected in parallel. In another example, the communications configuration adjusting unit may adjust/tune the transmitter phase in the communications device by shifting the phase in a phase-lock loop (PLL) in the analog transmitter driver 218 or selecting a specific phase in a delay-locked loop (DLL) in the analog transmitter driver. In some embodiments, the communications configuration adjusting unit adjusts the receiver demodulation configuration of the communications device, the receiver gain in the communications device, and/or a detector threshold (e.g., an Automatic gain control (AGC) detector threshold) in the communications device.

In an example operation of the control unit 200, when the communications device 240 is in card mode, the parameter obtaining unit 202 measures a detuning condition at the transmitter driver 218. Based on the detuning condition, the communications configuration adjusting unit 204 configures the transmitter output voltage of the communications device 240. Consequently, the load modulation amplitude (LMA) of the communications device 240 is set and the signal-to-noise ratio (SNR) at the corresponding reader device 230 is controlled.

In another example operation of the control unit 200, when the communications device 240 is in reader mode, the parameter obtaining unit 202 measures a detuning condition at the transmitter driver 218. Based on the detuning condition, the communications configuration adjusting unit 204 configures the transmitter output voltage of the communications device 240. Consequently, the carrier amplitude of the communications device 240 is set and the SNR at a corresponding RF device is controlled.

Figure 3:
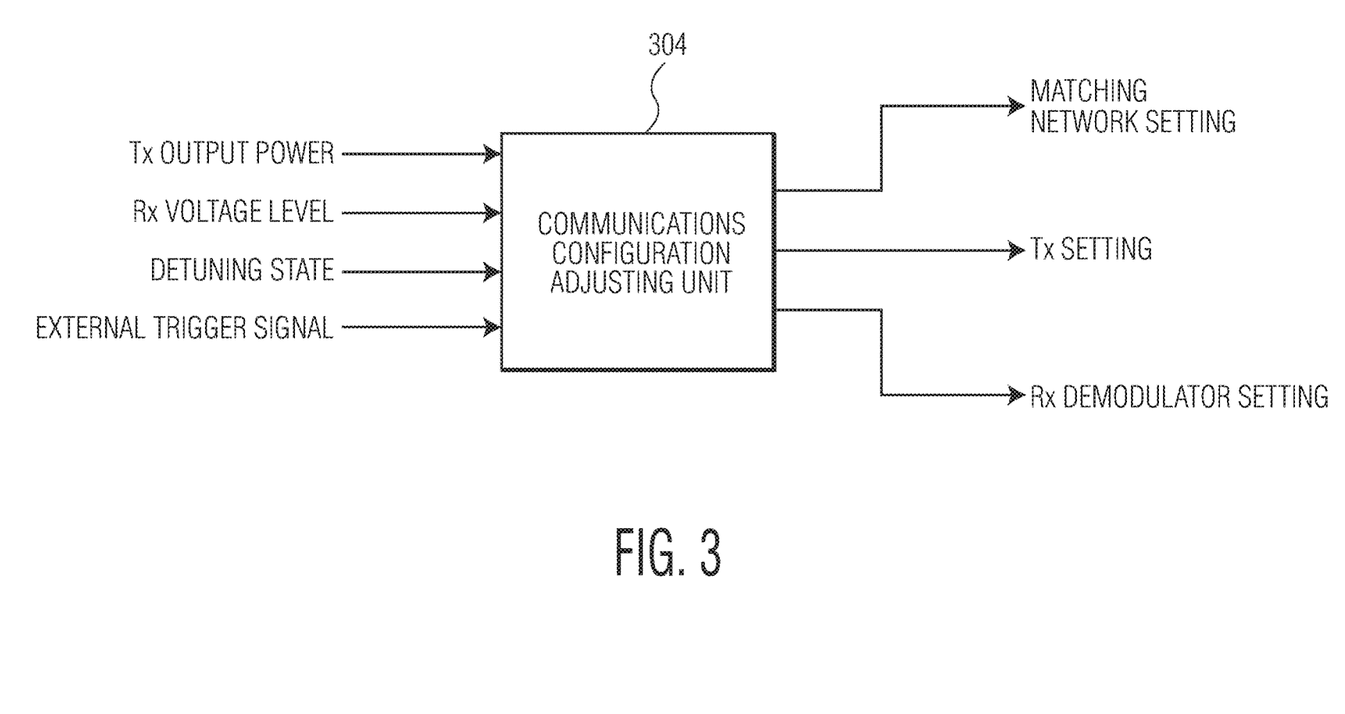
FIG. 3 depicts an embodiment of a communications configuration adjusting unit.

FIG. 3 depicts an embodiment of a communications configuration adjusting unit 304, similar to the communications configuration adjusting unit 204 depicted in FIG. 2. In the embodiment depicted in FIG. 3, the communications configuration adjusting unit uses sensor output data (e.g., the transmitter (TX) output power and/or the receiver (RX) voltage level) as well as an internal state (e.g., the detuning condition/state in the communications device 240) to generate adjustment/control signals for the respective tuning elements in the analog receiver 214, the transmitter driver 218, and/or the matching network 210. In some embodiments, the communications configuration adjusting unit receives an external trigger/control signal that is input into the communications device and adjusts a communications configuration of the communications device based on the external trigger/control signal. The communications configuration adjusting unit may be implemented as a function or a set of functions of the input parameters, a lookup table with indexes being the input parameters, or a combination of both. For example, the communications configuration adjusting unit may use a lookup table with column indexes being different combinations of a transmitter voltage and an RSSI of a received signal at the communications device and corresponding table entries being different configurations for the analog receiver 214, the transmitter driver 218, and/or the matching network 210. The communications configuration adjusting unit 304 depicted in FIG. 3 is one possible embodiment of the communications configuration adjusting unit 204 depicted in FIG. 2. However, communications configuration adjusting unit 204 depicted in FIG. 2 is not limited to the embodiment shown in FIG. 3.

Figure 4:
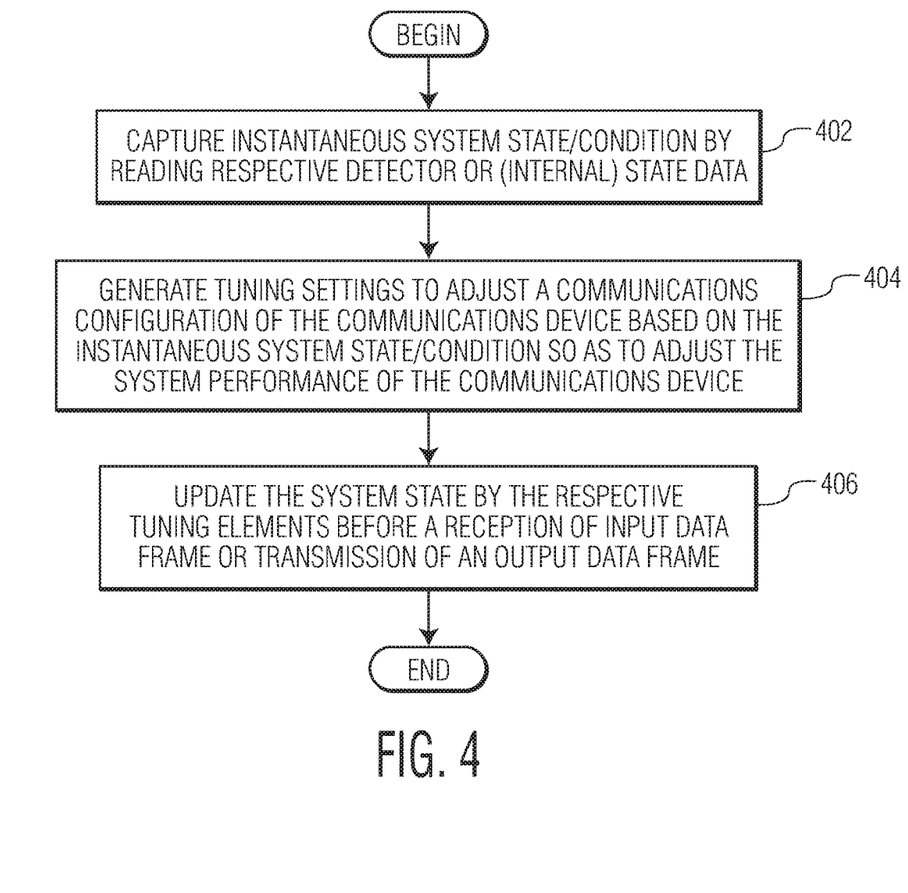
FIG. 4 is a process flow diagram of a method for operating a communications device that communicates via inductive coupling in accordance with an embodiment of the invention.

In some embodiments, the adjustment of a communications configuration of the communications device 240 is performed during reception of an input data frame or during transmission of an output data frame. Alternatively, the adjustment of a communications configuration is performed before or after reception of an input data frame or before or after transmission of an output data frame (i.e., the adjustment is not performed during reception of an input data frame or during transmission of an output data frame) to avoid disruption to an ongoing communications. FIG. 4 is a process flow diagram of a method for operating a communications device that communicates via inductive coupling in accordance with an embodiment of the invention. At block 402, an instantaneous system state/condition is captured by reading respective detector or (internal) state data. At block 404, tuning settings are generated to adjust a communications configuration of the communications device so as to adjust the system performance of the communications device based on the instantaneous system state/condition. At block 406, the system state is updated by the respective tuning elements before a reception of input data frame or transmission of an output data frame. The communications device may be the same or similar to the communications device 140 depicted in FIG. 1 and/or the communications device 240 depicted in FIG. 2.

Figure 5:
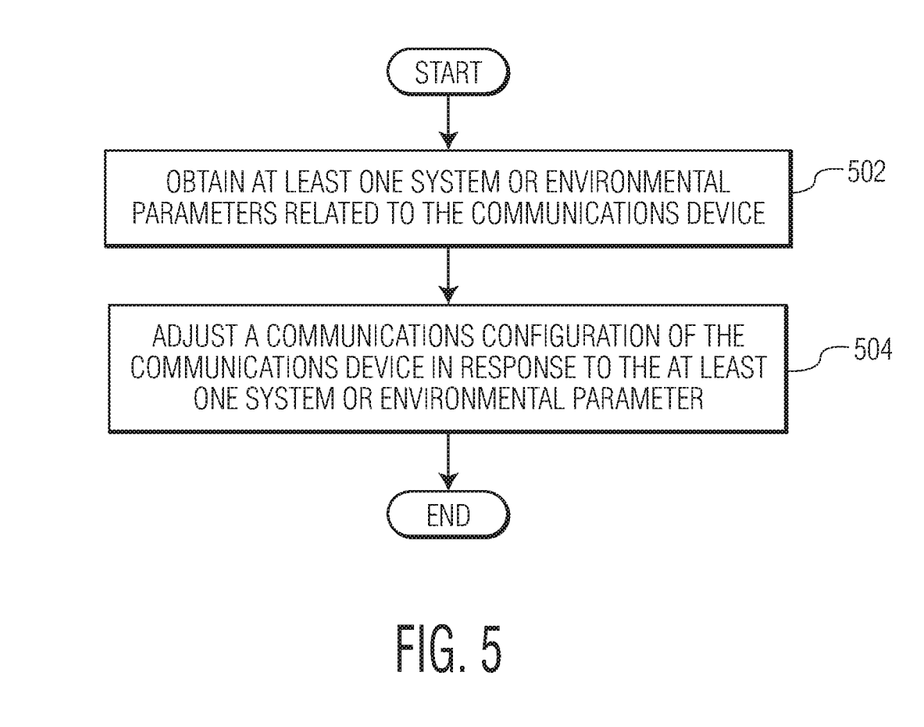
FIG. 5 is a process flow diagram of a method for operating a communications device that communicates via inductive coupling in accordance with another embodiment of the invention.

FIG. 5 is a process flow diagram of a method for operating a communications device that communicates via inductive coupling in accordance with another embodiment of the invention. At block 502, at least one system or environmental parameter related to the communications device is obtained. At block 504, a communications configuration of the communications device is adjusted in response to the at least one system or environmental parameter. The communications device may be the same or similar to the communications device 140 depicted in FIG. 1 and/or the communications device 240 depicted in FIG. 2.

Figure 6:
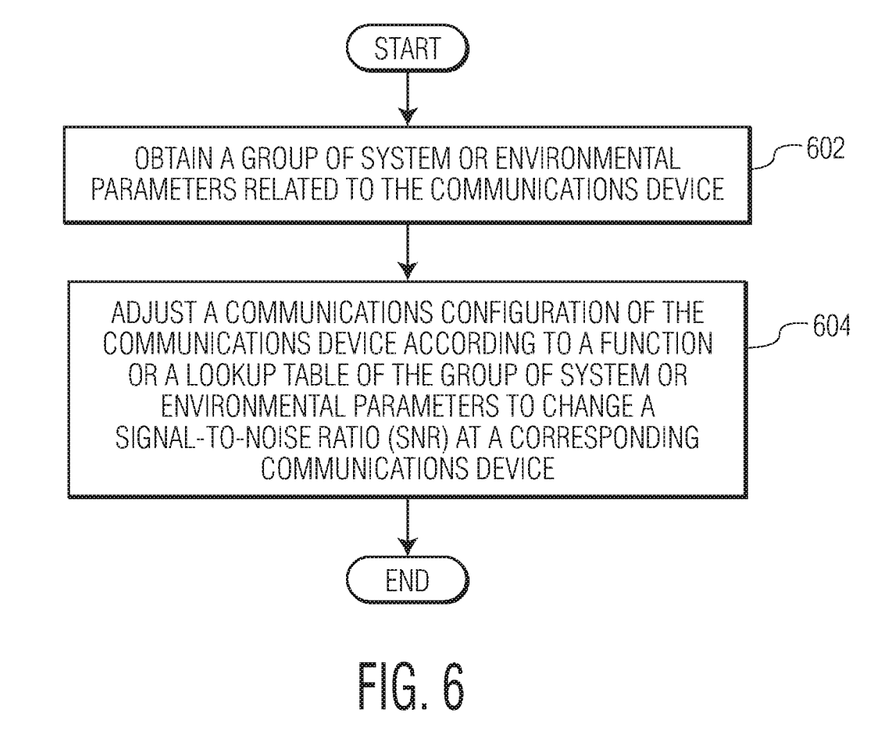
FIG. 6 is a process flow diagram of a method for operating a communications device that communicates via inductive coupling in accordance with another embodiment of the invention.

FIG. 6 is a process flow diagram of a method for operating a communications device that communicates via inductive coupling in accordance with another embodiment of the invention. At block 602, a group of system or environmental parameters related to the communications device is obtained. At block 604, a communications configuration of the communications device is adjusted according to a function or a lookup table of the group of system or environmental parameters to change a SNR at a corresponding communications device. The communications device may be the same or similar to the communications device 140 depicted in FIG. 1 and/or the communications device 240 depicted in FIG. 2. The corresponding communications device may be the reader device 230 depicted in FIG. 2.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a communications device that communicates via inductive coupling, the method comprising:
   obtaining a plurality of system or environmental parameters related to the communications device, wherein the system or environmental parameters comprise:
      information regarding a transmitter voltage or a transmitter current from the communications device; and
      information regarding a detuning condition in the communications device, wherein the information regarding the detuning condition comprises at least one of load information on a transmitter driver of the communications device and load information on an analog receiver of the communications device; and
   adjusting a communications configuration of the communications device for communications via inductive coupling in response to the system or environmental parameters to control a load modulation amplitude (LMA) of the communications device to adjust a transmitter phase of the communications device, and to increase a signal-to-noise ratio (SNR) at a corresponding communications device.

2. The method of claim 1, wherein adjusting the communications configuration of the communications device comprises adjusting the communications configuration of the communications device according to a function or a lookup table of a group of system or environmental parameters.

3. The method of claim 1, wherein the communications configuration comprises a transmitter impedance of the communications device.

4. The method of claim 1, wherein adjusting the communications configuration of the communications device comprises adjusting a receiver demodulation configuration of the communications device or a receiver gain in the communications device in response to the system or environmental parameters.

5. The method of claim 1, wherein adjusting the communications configuration of the communications device comprises adjusting the communications configuration of the communications device in response to the system or environmental parameters before or after reception of an input data frame or before or after transmission of an output data frame.

6. The method of claim 1, wherein obtaining the system or environmental parameters comprises receiving a control signal from a device that is external to the communications device.

7. The method of claim 1, wherein the system or environmental parameters further comprise an antenna characteristic of the communications device.

8. The method of claim 7, wherein the antenna characteristic of the communications device comprises the antenna characteristic of a loop antenna of the communications device.

9. The method of claim 7, wherein the antenna characteristic of the communications device comprises an antenna geometry of the communications device.

10. The method of claim 7, wherein the antenna characteristic of the communications device comprises an antenna geometry of a loop antenna of the communications device.

11. A communications device that communicates via inductive coupling, the communications device comprising:
   a parameter obtaining unit configured to obtain a plurality of system or environmental parameters related to the communications device, wherein the system or environmental parameters comprise:
      information regarding a transmitter voltage or a transmitter current from the communications device; and
      information regarding a detuning condition in the communications device, wherein the information regarding the detuning condition comprises at least one of load information on a transmitter driver of the communications device and load information on an analog receiver of the communications device; and
   a communications configuration adjusting unit configured to adjust a communications configuration of the communications device for communications via inductive coupling in response to the system or environmental parameters to control a load modulation amplitude (LMA) of the communications device, to adjust a transmitter phase of the communications device, and to increase a signal-to-noise ratio (SNR) at a corresponding communications device.

12. The communications device of claim 11, wherein the communications configuration comprises a transmitter impedance of the communications device.

13. The communications device of claim 11, wherein the communications configuration adjusting unit is configured to adjust a receiver demodulation configuration of the communications device or a receiver gain in the communications device in response to the system or environmental parameters.

14. The communications device of claim 11, wherein the system or environmental parameters further comprise an antenna characteristic of the communications device.

15. The communications device of claim 14, wherein the antenna characteristic of the communications device comprises the antenna characteristic of a loop antenna of the communications device.

16. The communications device of claim 14, wherein the antenna characteristic of the communications device comprises an antenna geometry of the communications device.

17. The communications device of claim 14, wherein the antenna characteristic of the communications device comprises an antenna geometry of a loop antenna of the communications device.

18. A method for operating a communications device that communicates via inductive coupling, the method comprising:

obtaining a group of system or environmental parameters related to the communications device, wherein the group of system or environmental parameters comprise:

information regarding a transmitter voltage or a transmitter current from the communications device; and information regarding a detuning condition in the communications device, wherein the information regarding the detuning condition comprises at least one of load information on a transmitter driver of the communications device and load information on an analog receiver of the communications device; and adjusting a communications configuration of the communications device for communications via inductive coupling according to a function or a lookup table of the group of system or environmental parameters to control a load modulation amplitude (LMA) of the communications device, to adjust a transmitter phase of the communications device, and to increase a signal-to-noise ratio (SNR) at a corresponding communications device, wherein the communications configuration comprises a transmitter impedance of the communications device.

19. The method of claim 18, wherein the system or environmental parameters further comprise an antenna characteristic of the communications device.

20. The method of claim 19, wherein the antenna characteristic of the communications device comprises an antenna geometry of the communications device.

\* \* \* \* \*